United States Patent [19]

Bomboire

[11] 4,089,724

[45] May 16, 1978

[54] COMPOSITE TEXTURED PRODUCTS AND THEIR MANUFACTURE

[75] Inventor: Rene'F. Bomboire, Wiltz, Luxembourg

[73] Assignee: Eurofloor S.A., Wiltz, Luxembourg

[21] Appl. No.: 676,690

[22] Filed: Apr. 14, 1976

Related U.S. Application Data

[62] Division of Ser. No. 448,451, Mar. 5, 1974, Pat. No. 4,017,658.

[30] Foreign Application Priority Data

Nov. 21, 1973 Luxembourg .......................... 68838

[51] Int. Cl.² ................................................ B32B 3/10

[52] U.S. Cl. .................................... 156/277; 427/261; 428/156; 428/172

[58] Field of Search .................. 156/277, 79; 428/156, 428/159, 161, 172, 203, 213, 158; 427/261, 262, 265, 258

[56] References Cited

U.S. PATENT DOCUMENTS

| | | | |
|---|---|---|---|
| 3,905,849 | 9/1975 | Bomboire | 156/79 |
| 4,017,658 | 4/1977 | Bomboire | 156/79 X |

*Primary Examiner*—William A. Powell
*Assistant Examiner*—William H. Thrower

[57] ABSTRACT

A technique for the manufacture of synthetic sheet material having a textured surface and suited for use as floor or wall covering. The technique in accordance with the invention includes the printing of a decoration on a support member and the applying of a transparent plastisol in the form of a discontinuous layer over and in accordance with the decoration. The invention also contemplates the application of a continuous wear layer which, in the final product, will either be disposed between the discontinuous transparent plastisol and the decoration or will cover the discontinuously applied plastisol which provides the textured effect.

5 Claims, 3 Drawing Figures

COMPOSITE TEXTURED PRODUCTS AND THEIR MANUFACTURE

CROSS-REFERENCE TO RELATED APPLICATIONS

The present application is a division of application Ser. No. 448,451 filed Mar. 5, 1974 now U.S. Pat. No. 4,017,658. A claim for priority based upon Luxembourg Application 68,838, filed Nov. 21, 1973, has been made in application Ser. No. 448,451 and applicant also claims the benefit of the filing date of Luxembourg Application 68,838 under the provisions of 35 U.S.C. 119, for this divisional application.

BACKGROUND OF THE INVENTION (1) Field of the Invention

The present invention relates to surface coverings comprised of synthetic materials. More specifically, the present invention is directed to methods for the manufacture of composite vinyl sheet material particularly well suited for use as floor or wall coverings. Accordingly, the general objects of the present invention are to provide novel and improved materials and methods of such character.

(2) Description of the Prior Art

The field of technology related to the manufacture of synthetic surface coverings has long strived to imitate, in as realistic a manner as possible, the appearance of natural decorative elements such as wood, marble, stones, bricks, etc. Thus, present day manufacturing techniques for use in the preparation of synthetic surface coverings are to a large extent directed toward the achievement of either the illusion of relief or an actual relief in the surface of the material.

In the introductory portion of the present applicant's U.S. Pat. No. 3,905,849 issued Sept. 16, 1975, the disclosure of which is incorporated herein by reference, several prior art processes for the manufacture of sheet material having a textured wear surface are discussed. The invention of U.S. Pat. No. 3,905,849 relates to the printing of a decoration on the verso of a sheet of transparent synthetic material followed by application of at least one discontinuous intermediate layer of an appropriate paste over selective regions of the printed sheet; the paste matching at least part of the decoration and being applied in regions which are to form the raised portions of the surface of the desired textured end product. Subsequently, in the present applicant's prior invention, the transparent sheet is laminated to a support in such a manner that the verso of the transparent sheet faces the support and the transparent synthetic sheet material thus flows into the cavities defined by the intermediate layer of paste. This prior technique results in the discontinuous intermediate layer applied to the verso of the transparent sheet causing formation of a relief on the recto of the finished product. The product produced by the present applicant's prior invention is thus a transparent sheet which comprises a wear layer overlying a decoration which in turn covers the discontinuously applied intermediate material used to achieve the relief effect; the composite comprising the transport sheet and intermediate layer being bonded to a support comprising one or more layers.

The necessity of printing a decoration on the transparent sheet has, however, been found to cause certain manufacturing difficulties. These difficulties may be attributed to the fact that the printed sheet is deformed when the assembly, defined by the sheet with the decoration thereon and the discontinuous intermediate layer of paste providing the relief, is heated in a gelation over prior to lamination to the support.

SUMMARY OF THE INVENTION

The present invention overcomes the above briefly discussed and other disadvantages of the prior art and comprises an improvement over the technique of U.S. Pat. No. 3,905,849. In accordance with the present invention the decoration is printed on a support and a discontinuous layer comprised of a transparent plastisol is thereafter applied over the printed decoration.

The present invention results in a product which unexpectedly has an appearance comparable to those produced in accordance with the teachings of U.S. Pat. No. 3,905,849; the decoration being seen through the discontinuous plastisol layer forming the relief in accordance with the present invention. An important advantage of the present invention is that it offers a remarkable flexibility which enables the manufacturing process to be adapted to various different working conditions and materials which may be employed.

According to the present invention it is possible to apply a uniform and regular wear layer over the discontinuous transparent plastisol, which itself covers the decoration, by several different methods and either before or subsequent to the passage of the composite through the gelation oven. Available techniques for application of the wear layer include the coating of a thin continuous and uniform layer with an air-knife coater, curtain coating and bonding to a transparent preform. In accordance with the present invention it is also possible to apply a continuous wear layer over the printed decoration and to thereafter apply the transparent plastisol used to create the relief effect over the wear layer. The composite product thus obtained is passed through a gelation oven after the application of the discontinuous transparent plastisol. Through appropriate choice of the nature of the wear layer and the plastisol which forms the discontinuous layer it is possible to obtain highly desirable effects. For example, if the wear layer has a matte finish and the plastisol which creates the relief is glossy after gelation, it is possible to imitate a surface comprised of glossy tiles joined with a cement.

A particularly novel feature of the present invention is the discovery that the composite product passed through the gelation oven should comprise at least one support layer which is dimensionally stable at the plastisol gelation temperature. However, in the practice of the invention it is nevertheless possible to print the decoration and to apply the discontinuous transparent plastisol layer to a support which does not possess this dimensional stability provided that this non-stable support is bonded to a second stable support before passage through the oven. In the description of the invention to follow the term "stable" is to be understood as referring to material which is dimensionally stable at the gelation temperature of the plastisol. The technique of applying the printing and discontinuous layer of plastisol in paste form to a support which does not possess dimensional stability at the gelation temperature presents a substantial economic advantage since the stable support material, which is generally comparatively expensive, is used only after quality control has insured that the other manufacturing steps prior to passage through the gelation oven have been performed correctly. Restated, the present invention precipitates important savings with respect to the wasting of the stable support material.

It will, of course, be understood that it is also possible to directly print the decoration on a stable support which may comprise one or more layers constituting the final support or backing for the product. Similarly, it is also possible to employ a stable intermediate support which is bonded to a final support after passage through the gelation oven. Such use of intermediate and final supports also confers an economic advantage by minimizing consumption of the relatively expensive final support material.

It is to be particularly observed that the unexpected possibility of depositing a discontinuous layer of transparent plastisol in accordance with a decoration printed on a support imparts considerable flexibility to the manufacturing process and, in fact, enables the process to be adapted in numerous ways to match the particular production conditions, the nature of the materials being used and the particular effect desired of the end product. Certain particular effects, such as glossy relief with imitation matte joints, which could previously be obtained only through practice of very expensive techniques can be produced simply and reliably with the present invention.

In accordance with the present invention the printing of the decoration on the support may be effected by any known process with the technique known as heliography being particularly well suited. The application of the transparent plastisol paste as a discontinuous layer may also be performed by any known process; silk screen printing having been found to be particularly useful.

BRIEF DESCRIPTION OF THE DRAWING

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENT

Figure 1:
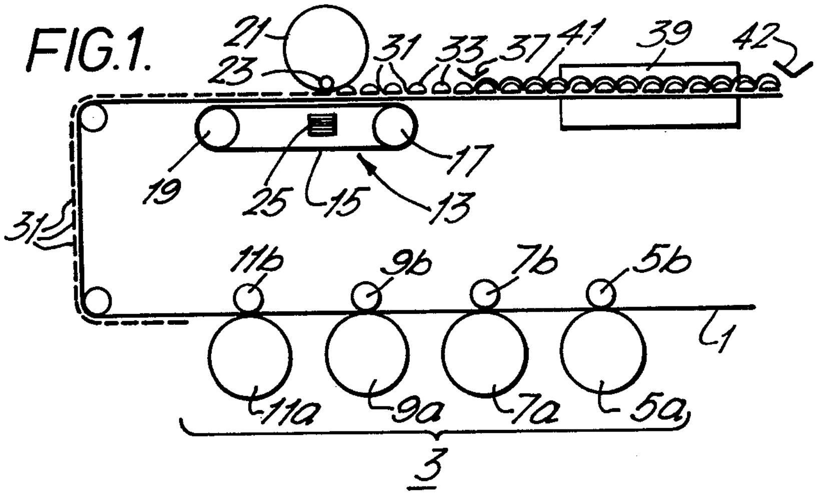
FIG. 1 is a schematic representation of a first technique for the manufacture of textured sheet material in accordance with the present invention, the technique depicted in FIG. 1 comprising the application of a continuous wear layer over a discontinuous transparent plastisol layer which covers a printed decoration on a support sheet.

Referring to FIG. 1, a support or base sheet is indicated at 1. This sheet is passed through a quadrichromy heliographic printing installation 3 comprising four printing cylinders **5*a*, 7*a*, 9*a* and 11*a* and four back-up cylinders 5*b*, 7*b*, 9*b* and 11*b*. As a result of the printing step the support sheet 1 will bear, on one surface thereof, a printed pattern as indicated at 31. The printed support is thereafter passed through a plastisol dispensing device indicated generally at 13** wherein a layer of a transparent plastisol in paste form is discontinuously applied over the printed decoration by a serigraphic process.

The plastisol applying device 13 comprises an endless belt 15 and two drive cylinders 17 and 19 therefore. Plastisol dispensing device 13 also includes a rotary serigraphic cylinder 21 which includes a roller-scraper 23. The printed support sheet passes between the cylinder 21 and belt 15. In the embodiment of FIG. 1 the roller-scraper 23 comprises a roll which is attracted downwardly against the support sheet by means of a magnet 25; the roller-scraper 23 thus forcing the plastisol through the frame of cylinder 21. The plastisol applying device 13 permits plastisol paste to be applied with a high degree of uniformity even with coating supports having a large width. The application of the plastisol layer by means of the serigraphic cylinder also permits the plastisol to be matched perfectly with the decoration applied by the printing surfaces of the printing device 3; i.e., the discontinuous transparent plastisol layer 33 is deposited exactly on the printed decoration 31 at the spots where a relief effect is desired. Thus, the composite sheet material exiting the plastisol dispensing device 13 comprises the support 1 having a printed decoration 31 and a discontinuous layer of transparent plastisol 33 covering preselected portions of the printed decoration.

As indicated schematically at 37, a continuous transparent wear layer 41 is applied over the discontinuous transparent plastisol paste 33 prior to the composite sheet material being transmitted through a gelation oven 39. The transparent wear layer 41, which itself directly covers the printed decoration 31, may be obtained by a curtain coating technique. In this technique a "curtain" of a sufficiently fluid plastisol flows by gravity onto the moving support sheet. A wear layer applied by means of such a curtain coating technique will cover the relief defined by the discontinuous plastisol paste 33 without distorting or squashing the relief defining material.

Subsequent to deposition of the wear layer 41, the multi-layer composite is passed through a gelation oven 39 and may thereafter be wound in a roll or may be further bonded to one or more support sheets. It is to be noted that the wear layer 41 may be applied subsequent to the passage of the printed support through the oven 39. This alternate technique is indicated symbolically at 42; i.e., the application of a transparent wear layer 41 to the composite sheet material subsequent to passage through the gelation oven is indicated at 42. The wear layer may be applied subsequent to gelation by means of curtain coating as discussed above. However, owing to the fact that the discontinuously applied plastisol paste 33 has gelled in oven 39, no particular precautions need be taken to prevent distortion of the relief defining material. Accordingly, if it is desired to apply the wear layer subsequent to gelation, a thin and regular uniform layer of plastisol may be applied to the composite by means of an air-knife coater or a preformed lining composed of a transparent sheet may be laminated to the composite.

Figure 2:
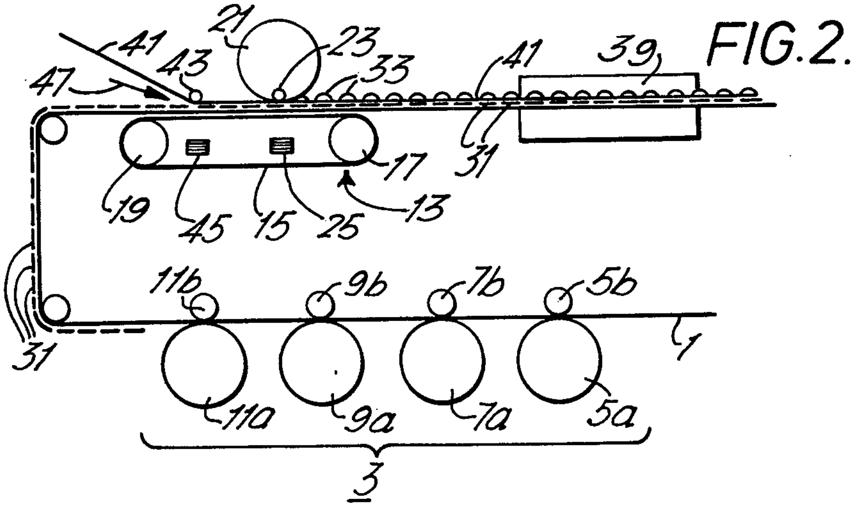
FIG. 2 is a schematic representation of a second embodiment of the present invention wherein the wear layer is disposed between the discontinuous transparent plastisol and the printed decoration on a support sheet during the manufacture of textured sheet materials.

Referring now to FIG. 2, an alternate technique to that described above in the discussion of FIG. 1 is shown schematically. In the FIG. 2 embodiment the wear layer comprises a transparent sheet 41 which is applied so as to be disposed between the printed support and the discontinuous intermediate layer of plastisol paste 33. The sheet 41 may be applied by feeding the transparent film below a "floating" magnetic rod 43 which is attracted by a magnet 45 while simultaneously feeding an adhesive, as indicated schematically at 47, into the region between the transparent sheet 41 and the printed decoration 31 on support 1.

The technique of FIG. 2 presents numerous advantages. Thus, for example, the FIG. 2 process easily and simply adapts to the production cycle of an article by heliographic printing of the decoration and serigraphic synchronized application of the plastisol which defines the relief. The FIG. 2 process also enables, when employing a cold setting adhesive, the obtaining of a lining or wear layer on the support 1 without deformation of the printed support. It is, of course, of great importance that the printed support not be deformed if the discontinuously applied plastisol 33 is to be perfectly matched with the printed decoration 31.

Continuing with a discussion of the FIG. 2 embodiment, the discontinuous layer of plastisol 33 will, after gelation, form a first discontinuous wear layer while the sheet 41 serves to protect the spaces formed between this discontinuous layer. When the relief pattern is meant to represent tiles, the appropriate choice of the plastisol 33 makes it possible to obtain a glossy relief while the sheet 41 appearing between the relief may be matte and colored so as to represent the jointing cement. Thus, in a particularly efficient and inexpensive manner, an effect may be obtained which was especially difficult to realize in the prior art.

In the embodiments of FIGS. 1 and 2 the support 1 must possess a sufficiently high degree of thermal stability so that it will not be deformed when passing through the gelation oven 39. The support must also be printable and may, for example, be the final support for the product. Thus, for example, support 1 may comprise a calendered vinyl sheet on an asbestos felt, an expandable cellular sheet which is laminated to an asbestos felt, a woven or non-woven fabric, wood, metal, a stable synthetic sheet material, etc. Thus, the support 1 is selected according to the intended use of the finished product and may be comprised of one or more layers.

Alternately, the support 1 may also be constituted by a thermally stable intermediate which may be laminated to a final support after the composite has been passed through oven 39. This intermediate support layer, which necessarily must be printable with the inks used in the printing device 3, may be paper, a stable synthetic sheet material or any other suitable material.

It is also possible to employ a support 1 which is not sufficiently stable to resist deformation in the gelation oven 39 and to apply thereon the printing and, optionally, the discontinuous plastisol layer 33. The printing and application of the discontinuous plastisol paste to such a support does not pose any processing difficulties. However, it is necessary that such a support be lined, before passing through the oven, with an appropriate stable support medium which, as indicated above, may be the final support or intermediate support. Thus, the support may be selected taking into account their end use and those materials which offer the best performance/price ratio for that end use. It is possible to select a first support which is particularly easy to print and to laminate that first support with an intermediate support sheet which imparts the desired thermal stability to the composite prior to passing the composite through oven 39. Thereafter, subsequent to gelation, the composite may be lined or bonded to a final support which imparts any desired further property to the composite such as, for example, good acoustic isolation characteristics. Thus it will be obvious to those skilled in the art that the present invention permits a great deal of flexibility in the choice of the materials employed in the manufacture of a textured surface covering.

Figure 3:
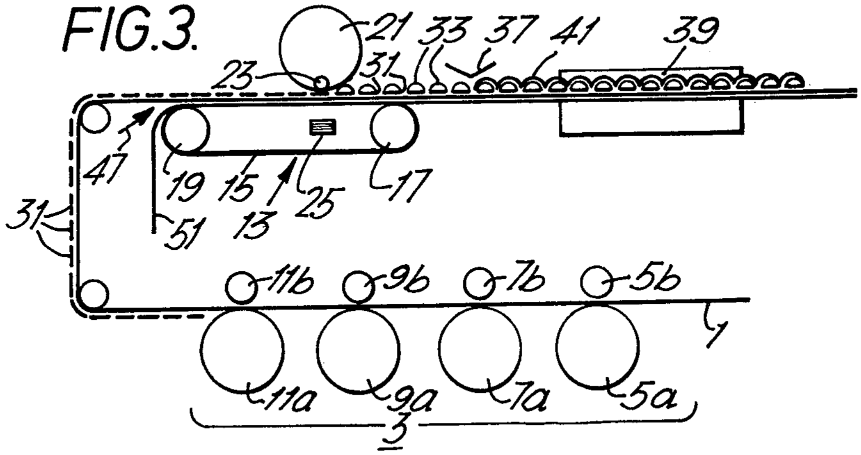
FIG. 3 is a schematic representation of a third method in accordance with the present invention, the technique of FIG. 3 representing a manufacturing process for the production of textured sheet material wherein the decoration is printed on and the discontinuous layer of plastisol thereafter applied to an inexpensive support sheet which lacks dimensional stability and a stable support layer is subsequently added to the product.

Referring now to FIG. 3, a technique is represented wherein the initial support sheet 1 is of insufficient thermal stability to permit the semi-finished product to be passed through the gelation oven 39. Accordingly, it is necessary to apply, to the sheet 1, a stable support sheet 51 prior to passage of the composite into oven 39. FIG. 3 represents the application of the stable support sheet 51 to the side of sheet 1 which has not been printed; sheet 51 being adhesively bonded to sheet 1 by means of an adhesive applied as indicated at 47.

Regardless of which technique of the present invention is to be employed, the rheological characteristics of the plastisol paste 33 must be carefully selected so as to enable its deposition on the support sheet by means of a silk screen printing process. As discussed above, the plastisol paste must be forced through the perforated printing frame by means of a scraper, for example scraper-roller 23, and once on the support sheet the plastisol must spread sufficiently so as to form continuous layers and eliminate traces of the screen while simultaneously maintaining the sharpness of the relief pattern. The gelation temperature of the paste imparting relief is determined by the formulation of the paste. A relatively low gelation temperature, in the range of 120°-130° C, may be obtained by judicious choice of the grade of polyvinyl chloride utilized. This low gelation temperature makes higher printing speeds possible and thus enhances production efficiency.

The present invention will be further described with reference to the following examples:

EXAMPLE 1

The different operating steps are performed in a unit of the type described in the discussion above of FIG. 1.

First an 0.80 mm thick asbestos felt is coated with 100 gr/m$^2$ of a plastisol having the following formulations:

| Ingredients | Parts by Weight |
|---|---|
| Poly (vinyl chloride) (emulsion grade) | 120 |
| Plasticizers (phthalate) | 145 |
| Secondary plasticizers | 25 |
| Fillers (chalk) | 300 |
| Diluent | 4 |
| Stabilizers (organic calcium and zinc compounds) | 1.2 |

This coating step is performed with an air-knife, the coating is pregelified and the coating is then smoothed on a cylinder which is heated to 140° C.

A sheet of poly(vinyl chloride), which will give the background color of the decoration, having a thickness of 0.60mm is calendered. The sheet is formed from the following materials:

| Ingredients | Parts by Weight |
|---|---|
| Poly (vinyl chloride) (suspension grade) | 100 |
| Fillers (chalk) | 120 |
| Plasticizers (phthalate) | 30 |

-continued

| Ingredients | Parts by Weight |
|---|---|
| Stabilizers (barium cadmium solid) | 3 |
| Stearic acid | 0.4 |
| Pigments | — |

This pvc sheet is laminated to the coated-asbestos felt at a temperature of 150° C resulting in a stable and printable support 1.

This support is printed (in 5*a*, 5*b*, 7*a*, 7*b*, 9*a*, 9*b*, 11*a*, 11*b*) by heliography with inks composed of a copolymer of poly(vinyl chloride) in solution in ketonic solvents and pigmented by means of mineral and organic dyes.

The relief matching the heliographic printing is formed by silk screen printing 13 of a plastisol paste. The paste for screen printing has the following formulation:

| Ingredients | Parts by Weight |
|---|---|
| Vinyl acetate copolymer | 100 |
| Plasticizers (modified phthalate) | 36 |
| Plasticizers (butylbenzyl phthalate) | 12 |
| Epoxidized soya bean oil | 5 |
| Stabilizers (tin based) | 2 |
| Surfactant | 3 |

The amount of deposited paste may vary between 250 and 500 gr/m$^2$, according to the decoration, which corresponds to a relief of 0.20 to 0.40 mm; i.e., between approximately 10 and 20 mils. This transparent plastisol is gelified by passing through an oven 39 at 140° C. The product is then cooled and wound into rolls for storage.

The rolls of printed product are, prior to use, coated (in 42) by means of an air-knife with a uniform layer of 0.20 mm thickness having the following formulation:

| Ingredients | Parts by Weight |
|---|---|
| Poly (vinyl chloride) (emulsion grade) | 100 |
| Plasticizers (butylbenzyl phthalate) | 45 |
| Stabilizers (tin based) | 2 |
| Surfactant | 3 |
| Diluent (white spirit)-amount necessary to adjust the viscosity | |

This wear layer is eventually gelified by passing through an oven at 160° C.

EXAMPLE 2

The different operating steps are performed in a unit of the type described in the discussion above of FIG. 2.

A stable and printable support is prepared by impregnating, with 250 gr/m$^2$ of plastisol, a non-woven fabric of 50 gr/m$^2$. The non-woven fabric is a non-woven polyester obtained by a wet method. The plastisol has the following formulation:

| Ingredients | Parts by Weight |
|---|---|
| PVC (emulsion grade) | 100 |
| Plasticizers (butylbenzyl phthalate) | 45 |
| Stabilizers (tin based) | 2 |
| Surfactant | 3 |
| Diluent (white spirit)-amount necessary to adjust the viscosity | |

Pigments are added to obtain the background color of the decoration.

The plastisol is gelified and smoothed by passing between two rolls heated at 160° C.

This stable and printable support 1 is printed (in 5*a*, 5*b*, 7*a*, 7*b*, 9*a*, 9*b*, 11*a*, 11*b*) by heliography with inks composed of a copolymer of poly(vinyl chloride) in solution in ketonic solvents and pigmented by means of mineral and organic dyes.

Before printing the relief by screen printing a transparent calendered film 41 having a thickness of 0.25 mm and following formulation is lined under a magnetic scraper:

| Ingredients | Parts by Weight |
|---|---|
| Poly (vinyl chloride) (suspension grade) | 100 |
| Plasticizers BBP | 23 |
| Stabilizers (barium cadmium) | 3 |
| Epoxydized soya bean oil | 5 |
| Epoxydized monoester | 2 |
| Stearic acid | 0.4 |
| Acrylic modifier | 2 |
| Minex 7 (silicon and aluminum oxides) | 15 |

In order to enable this film to adhere to the printed support, use is made (in 47) of an adhesive having the following formulation:

| Ingredients | Parts by Weight |
|---|---|
| Plasticizers (phthalate) | 30 |
| Vinyl copolymer in solution in ketonic solvents | 70 |

The relief matching the heliographic printing is applied to the transparent film 41 by serigraphy (in 13). The transparent paste used for screen printing has the following formulation:

| Ingredients | Parts by Weight |
|---|---|
| Vinyl acetate copolymer | 100 |
| Plasticizers (modified phthalate) | 36 |
| Plasticizers (butylbenzyl phthalate) | 12 |
| Epoxydized soya bean oil | 5 |
| Stabilizers (tin based) | 2 |
| Surfactant | 3 |

The amount of paste deposited may vary between 250 and 500 gr/m$^2$, according to the decoration, corresponding to a relief of 0.20 to 0.40 mm. This transparent plastisol paste is gelified by passing through an oven 39 at 140° C. The product is then cooled and wound in rolls for storage.

The support may thereafter be laminated, at 170° C, on two calendered sheets having a thickness of 0.45 mm and the following formulation:

| Ingredients | Parts by Weight |
|---|---|
| Poly (vinyl chloride) (suspension grade) | 100 |
| Filers (chalk) | 120 |
| Plasticizers (phthalate) | 30 |
| Stabilizers (barium cadmium solid) | 3 |
| Stearic acid | 0.4 |
| Pigments | — |

Owing to the formulation used, a product is obtained wherein the parts in relief are glossy and the other are matte.

EXAMPLE 3

The various operating steps are performed in a unit of the type described in the discussion of FIG. 3.

A calendered film having a thickness of 0.15 mm and the following formulation was prepared:

| Ingredients | Parts by Weight |
|---|---|
| Poly (vinyl chloride) (suspension grade) | 100 |
| Plasticizers BBP | 23 |
| Stabilizers (barium cadmium) | 3 |
| Epoxydized soya bean oil | 5 |
| Epoxydized monester | 2 |
| Stearic acid | 0.4 |
| Acrylic modifier | 2 |
| Minex 7 (silicon and aluminum oxides) | 15 |

Furthermore the film is pigmented to obtain the background color of the decoration.

This film 1 is printed by heliography (5*a*, 5*b*, 7*a*, 7*b*, 9*a*, 9*b*, 11*a*, 11*b*) with inks composed of a poly(vinyl chloride) copolymer in solution in ketonic solvents and pigmented with mineral and organic dyes.

A support composed of an asbestos felt, coated as in Example 1 with poly(vinyl chloride) and lined on a 0.30 mm thick expandable substratum, is lined under film 1 by means of the serigraphic scraper and bonded to film 1 with an adhesive of the following formulation:

| Ingredients | Parts by Weight |
|---|---|
| Plasticizers (phthalate) | 30 |
| Vinyl copolymer in solution in ketonic solvents | 70 |

The formulation of the expandable calendered layer is as follows:

| Ingredients | Parts by Weight |
|---|---|
| Poly (vinyl chloride) (suspension grade) | 75 |
| Phthalate BBP | 11 |
| Epoxydized soya bean oil | 4 |
| Epoxydized monoester | 4 |
| Phenol-cresol alkylsulfonate | 24 |
| Zinc octoate (Kicker) | 1.6 |
| Fillers (kaolin) | 16 |
| Acrylic modifier | 4 |
| Blowing agent | 1.6 |
| Pigments | — |

The relief matching the heliographic printing is applied (in 13) by screen printing. The formulation of the paste used for screen printing is as follows:

| Ingredients | Parts by Weight |
|---|---|
| Vinyl acetate copolymer | 100 |
| Plasticizers (modified phthalate) | 36 |
| Plasticizers (butylbenzyl phthalate) | 12 |
| Epoxydized soya bean oil | 5 |
| Stabilizers (tin based) | 2 |
| Surfactant | 3 |

The amount of paste deposited may vary between 250 and 500 gr/m$^2$, according to the decoration, corresponding to a relief of 0.20 and 0.40 mm. The plastisol paste is gelified by passage through an oven at 140° C. The product is then cooled and wound on rolls for storage.

This composite is, prior to use, laminated to a 0.25 mm thick transparent layer of the following formulation:

| Ingredients | Parts by Weight |
|---|---|
| Poly (vinyl chloride) (suspension grade) | 100 |
| Plasticizers BBP | 23 |
| Stabilizers (barium cadmium) | 3 |
| Epoxydized soya bean oil | 5 |
| Epoxydized monoester | 2 |
| Stearic acid | 0.4 |
| Acrylic modifier | 2 |
| Minex 7 (silicon and aluminum oxides) | 15 |

The final transparent layer is applied in liquid form and the product is gelified by passage through an oven at 150° C.

The resulting cover sheet preferably follows the shape of the relief.

The product is then passed through an oven at 180° C so as to expand the 0.30 mm thick substream and to obtain a cellular layer of 0.60 mm.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A process for the manufacture of sheet material having a textured surface comprising the steps of:
   - providing a decoration on a dimensionally stable support;
   - forming a continuous wear layer over the printed decoration;
   - applying at least one discontinuous layer of a transparent plastisol of at least 10 mils thickness over the wear layer in registration with at least a part of the printed decoration; and
   - passing the printed support which bears the wear layer and the discontinuous plastisol through a gelation oven to cause gelation of the plastisol.

2. A process as claimed in claim 1 wherein the application of the transparent plastisol is performed by silk screen printing.

3. The process of claim 1 wherein the step of providing a decoration comprises printing a design on a deformable support and wherein said process further comprises the step of:
   - laminating the deformable support to a temperature stable support before passage through the gelation oven.

4. The process of claim 2 wherein the step of providing a decoration comprises printing a design on a deformable support and wherein said process further comprises the step of:
   - laminating the deformable support to a temperature stable support before passage through the gelation oven.

5. A process for the manufacture of sheet material having a textured surface comprising the steps of:
   - printing a decoration on sheet material;
   - forming a continuous wear layer over the printed decoration;
   - applying at least one discontinuous layer of a transparent plastisol of at least 10 mils thickness over the wear layer in registration with at least a part of the printed decoration;
   - laminating the sheet material having the decoration printed thereon to a temperature stable support; and
   - passing the laminate including the support and the printed sheet which bears the wear layer and the discontinuous plastisol through a gelation oven to cause gelation of the plastisol.

* * * * *